United States Patent
Honig et al.

[15] 3,684,758
[45] Aug. 15, 1972

[54] PROCESS FOR THE PRODUCTION OF MODIFIED CATIONIC EMULSION POLYMERS WITH CATIONIC POLYURETHANE

[72] Inventors: Hans Ludwig Honig, Leverkusen; Carlhans Suling, Odenthal-Hahnenberg; Dieter Dieterich; Artur Reischl, both of Leverkusen, all of Germany

[73] Assignee: Farbenfabriken Bayer Aktiengesellschaft, Leverkusen, Germany

[22] Filed: Oct. 21, 1970

[21] Appl. No.: 82,795

[30] Foreign Application Priority Data

Oct. 23, 1969 Germany..........P 19 53 345.0

[52] U.S. Cl.......260/29.6 NR, 117/161 RP, 260/29.4 UA, 260/29.7 NR, 260/859 R, 260/859 PV

[51] Int. Cl..............................................C08f 45/24
[58] Field of Search...260/29.6 NR, 29.4 UA, 859 R, 260/859 PV

[56] References Cited

UNITED STATES PATENTS 3,249,654  5/1966  von Bonin et al..........260/874
3,388,087  6/1968  Dieterich et al....260/29.2 TN
3,539,483  11/1970  Keberle et al......260/29.6 NR

*Primary Examiner*—Harold D. Anderson
*Attorney*—Robert A. Gerlach and Sylvia Gosztonyi

[57] ABSTRACT

A process is provided for the production of stable aqueous polymer dispersions by subjecting vinyl monomers to radical emulsion polymerization in the presence of a stable aqueous dispersion of a high molecular weight cationic polyurethane which is gel-like in character.

8 Claims, No Drawings

PROCESS FOR THE PRODUCTION OF MODIFIED CATIONIC EMULSION POLYMERS WITH CATIONIC POLYURETHANE

Aqueous emulsions of polyurethanes containing blocks of vinyl polymers can be obtained by copolymerizing vinyl monomers with polyurethanes having terminal vinyl groups in an aqueous emulsifier-containing medium. Unfortunately, this process is complicated in the preparation of the polyurethane since a prepolymer containing terminal isocyanate groups is reacted at one end of the chain with a vinyl monomer containing an active hydrogen atom, for example hydroxyethyl acrylate, while chain extension is effected via the second isocyanate group with the result that a polyurethane containing two terminal vinyl groups is formed. This polyurethane is dissolved in one or more vinyl monomers and the resulting mixture is subjected to radical polymerization in an aqueous medium in the presence of an emulsifier.

It is also known that olefins, olefins with nitrogen-containing groups or vinyl esters can be radically grafted onto polyalkylene glycols either in bulk or in solution when the terminal hydroxyl groups of the glycol have been reacted with diisocyanates as described in German Pats. Nos. 1,077,430 and 1,105,179.

The radical polymerization of vinyl or vinylidene compounds onto polyacetals containing urethane groups is described in U.S. Pat. No. 3,249,654.

Finally, it has also been proposed to employ high molecular weight cationic polyurethanes containing quaternary ammonium or tertiary sulphonium groups as emulsifiers for polymerization reactions as described in U.S. Pat. No. 3,388,087.

It is therefore an object of this invention to provide stable aqueous polymer dispersions and a method for preparing them which are devoid of the foregoing disadvantages.

Another object of this invention is to provide a process for the production of stable aqueous polymer dispersions in the presence of gel-like particles which serve as a grafting substrate.

A further object of this invention is to provide stable aqueous polymer dispersions and a method for preparing them which does not require the presence of an emulsifier.

A still further object of this invention is to provide stable aqueous polymer dispersions which are eminently suitable as coating compositions, adhesives and binders with excellent adhesive properties the ultimate hardness and flexibility of which can be easily adjusted if desired.

The foregoing objects and others which will become apparent from the following description are accomplished in accordance with this invention, generally speaking, by providing a process for the production of stable aqueous polymer dispersions which comprises polymerizing 5 – 95 percent by weight based on the total amount of non aqueous matter of olefinically unsaturated monomers under radical emulsion polymerization conditions in the presence of 95 – 5 percent by weight based on the total amount of non aqueous matter of a cationic polyurethane having a molecular weight of at least 20,000 and containing from about 0.05 to about 5 percent by weight of ammonium- or sulphonium groups which polyurethane is gel-like in character and which is present in the form of a stable aqueous dispersion.

More particularly, the process is carried out by stirring an aqueous emulsion of the cationic polyurethane with a radically polymerizable vinyl monomer or monomer mixture and carrying out polymerization under conventional emulsion polymerization conditions as described in "Methoden der Organischen Chemie" Houben-Weyl Vol. 14/1, 4th edition, pages 133–560. The vinyl monomer may be added either all at once, or initially in part only, the remainder being added during the reaction.

The cationic polyurethane from which the dispersions suitable for use in the process of this invention are prepared contain ammonium or sulphonium groups and can be obtained by methods known per se from relatively high molecular weight compounds having reactive hydrogen atoms and molecular weights of from 300 to 20,000, organic polyisocyanates and, optionally, chain extenders containing reactive hydrogen atoms. It is essential, however, to employ from 0.5 to 10 percent of a cross-linking agent which may be a tri- or tetrafunctional polyol, polyamine or polyisocyanate or may be an agent which has a cross-linking effect such as a polyfunctional alkylating agent, a primary diamine which is in fact tri- or tetrafunctional towards isocyanate groups; excess of any usual diisocyanate which means an NCO/OH + NH — ratio from about 1.01 to about 1.6; formaldehyde or derivatives thereof. If the cross-linking agent is a polyesterpolyol or polyetherpolyol having a molecular weight above 800 the given percentage refers only to the polyfunctional monomer component which is in most cases trimethylolethane, trimethylolpropane, pentaerythrital or sorbitol. Such cross-linking agents are listed for instance in U.S. Pats. Nos. 3,201,372, 3,350,362, 3,479,310, 3,384,606, 3,410,187.

Some specific examples for cross-linking agents are the following:

glycerol, trimethylolethane, trimethylolpropane, trifunctional polyetherpolyols which are oxalkylation products of the foresaid compounds, triethanolamine, water, diethylenetriamine, 1.2.4-benzene-tricarboxylic acid, the trimerisation product of a diisocyanate such as toluylen-2,4-diisocyanate or of mixtures of toluylen-diisocyanate and hexamethylene-1,6-diisocyanate, or any other polyisocyanate containing more than two isocyanate groups, ethylene diamine, hexamethylene diamine, N-methyl-bis-3-aminopropylamine, 1,4-dibromobutane, 1.3-bischloromethyl-4.6-dimethyl-benzene, N,N,N',N'-tetramethylethylenediamine, sulfuric acid, phosphoric acid, formaldehyde, melamine-hexamethylolhexamethylether. Preferred cross-linking agents are diisocyanates when used in excess over isocyanate-reactive groups, the cross-linking effect being due to formation of biurets or allophanates.

Any of the known and conventionally employed compounds having at least two reactive hydrogen atoms and a molecular weight of from 300 to 20,000, organic polyisocyanates and optionally chain extending agents containing reactive hydrogen atoms may be used. Examples of these components can be found in U.S. Pat. No. 3,479,310; U.S. Pat. application, Ser. No. 867,931, filed on Oct. 20, 1969, German Auslegeschrift No. 1,067,678 and U.S. Pats. Nos. 3,201,372 and 3,350,362.

The aqueous polyurethane dispersions to be used in the process of this invention should possess the following properties:
1. The polyurethanes should have an average molecular weight in excess of about 20,000, and preferably in excess of about 100,000.
2. The individual latex particles should be gel-like in character; a sample of the latex (dispersion) should not dissolve to form a clear solution in tetrahydrofuran.

Because the latex particles must be gel-like in character, they do not exert an emulsifying effect since emulsifiers must be soluble and diffusible, i.e. uncrosslinked. On the other hand, these gel particles serve as an ideal grafting substrate since they are able to absorb considerable quantities of monomers, swelling as they do so.

Examples of suitable methods for preparing the aqueous polyurethane dispersions to be used in the practice of this invention can be found in Belgian Pats. Nos. 653,223; 658,026; and 730,543; in published Dutch Specification No. 67 03,743; and in German Auslegeschrifts Nos. 1,187,012; 1,184,946; 1,178,586 and 1,179,363. Polyurethane dispersions containing from about 0.05 to about 5 percent of ammonium or sulphonium groups as cationic groups are particularly suitable for use in the practice of this invention.

In principle, any radically polymerizable monovinyl and polyvinyl compounds and mixtures thereof may be used as the vinyl monomers in the practice of this invention including any of those listed in U.S. Pat. No. 3,225,119. Some examples of suitable compounds include:
1. Esters of a,b-unsaturated carboxylic acids such as, for example, methyl methacrylate, ethyl acrylate, butyl acrylate, stearyl methacrylate, hydroxypropyl acrylate, 2-aminoehtyl methacrylate hydrochloride, dimethylaminoethyl methacrylate, methoxymethyl methacrylate, chloromethyl methacrylate, dichlorotriazinyl-aminoethyl methacrylate, esters of maleic acid, fumaric acid or itaconic acid and the like;
2. a,b-unsaturated carboxylic acids such as, for example, acrylic acid, methacrylic acid, maleic acid and the like;
3. Amides of a,b-unsaturated carboxylic acids such as, for example, acrylamide, methacrylamide, maleic acid amide, maleic acid imide and the like;
4. Substituted amides of unsaturated carboxylic acids such as, for example, methylol methacrylamide, methoxymethyl acrylamide, N-(methylacrylamidomethyl)-urethane, N-(chloroacetamidomethyl)-acrylamide and the like;
5. Nitriles of a,b-unsaturated carboxylic acids such as, for example, acrylonitrile, methacrylonitrile and the like;
6. Vinyl esters such as, for example, vinyl acetate, vinyl chloroacetate, vinyl chloride and the like;
7. Vinyl ethers such as, for example, vinyl ethyl ether and the like;
8. Vinyl ketones such as, for example, vinyl methyl ketone and the like;
9. Vinyl amides such as, for example, vinyl formamide, vinyl acetamide and the like;
10. Aromatic vinyl compounds such as, for example, styrene, vinyl toluene and the like;
11. Heterocyclic vinyl compounds such as, for example, vinyl pyridine, vinyl pyrrolidone and the like;
12. Vinylidene compounds such as, for example, vinylidene chloride and the like;
13. Divinyl compounds such as, for example, divinyl benzene, butane diol dimethacrylate and the like;
14. Monoolefins such as, for example, ethylene, propylene and the like;
15. Conjugated diolefins such as, for example, butadiene, isoprene, 2-chlorobutadiene and the like;
16. Allyl compounds such as, for example, allyl acetate, allyl alcohol and the like.

Any suitable polymerization catalysts may be used including inorganic peroxidic compounds such as potassium or ammonium persulphate, hydrogen peroxide or percarbonates; organic peroxidic compounds, such as acyl peroxides including, for example, benzoyl peroxide; alkyl hydroperoxides, such as tert-butyl hydroperoxide, cumene hydroperoxide and p-methane hydroperoxide; dialkyl peroxides such as di-tert-butyl peroxide; peroxy esters such as tert-butyl perbenzoate and the like and mixtures thereof. The organic or inorganic peroxidic compounds are advantageously used in combination with any suitable reducing agents known per se, including sodium pyrosulphite or bisulphite, sodium formaldehyde sulphoxylate, triethanolamine, tetraethylene pentamine and the like. Also azo compounds such as azoisobutyronitril, azoisobutyric acid ethylester, azoisobutyroamidine,4,4'4-cyanovaleric acid and the like are particularly suitable. The initiators which decompose into radicals may be used alone or in combination with reducing agents or heavy metal compounds. Sodium pyrosulphite, potassium pyrosulphite, formic acid, ascorbic acid, hydrazine derivatives, amine derivatives and rongalite are examples of reducing agents. The heavy metal compounds may be present either in an oil soluble or in a water soluble form. Water soluble heavy metal compounds include for example silver nitrate, halides or sulphates of divalent or trivalent iron, cobalt or nickel or salts of titanium or vanadium of lower valences state. Examples of oil soluble heavy metal compounds are cobaltnaphthenate and the acetyl acetone complexes of vanadium, cobalt, titanium, nickel or iron. Preferred initiator systems are combinations of oxidizing agents with reducing agents such as combinations of above peroxides or inorganic oxidizing agents such as metal chlorates, metal chlorides or metal hypochlorites with reducing agents such as hydrazine, hydroxyl amine and especially compounds of the divalent or tetravalent sulfur such as metal sulphites, metal sulphides, metal thiosulphates and especially sulphinates such as sodium hydroxymethyl sulphinate.

The catalysts are employed in the catalytic quantities normally used to initiate polymerization reactions of this kind, i.e. in quantities of from about 0.01 to about 5 preferably 0.02 to 1 percent by weight, based on the total weight of the monomer.

The usual regulators such as long-chain alkyl mercaptans, diisopropyl xanthogenate, nitro compounds or organic halogen compounds, may also be used during polymerization to influence molecular weight. The regulator may optionally be used in amounts of from 0.05 to 5 percent by weight based on the monomers.

Typical examples are nitro compounds such as β-nitrostyrene, panitroaniline, benzal-p-nitraniline, halogen containing compounds such as tetraiodomethane, iodoform, benzyliodide, allyliodide, N-chlorophtalimide, tribromomethane, 1,1,1-tribromo-2-methyl-propanol-2, mecaptanes such as n-dodezylmercaptane, tetradezylmercaptane, diisopropylxantogendisulphide etc.

The polymerization temperatures are governed both by the type of monomer used and the activation system employed, but generally range from about 0° to about 150°C., and preferably from about 30° to about 100°C.

Any suitable cationic or non-ionic emulsifiers, or combinations thereof may be used as emulsifiers including cationic emulsifiers such as salts of quaternary ammonium and pyridinium compounds. Typical examples of suitable emulsifiers are salts of $C_{10}$–$C_{20}$-amines such as salts of alkyl-, aryl-, arylalkyl- or alkylarylamines with inorganic or organic acids. Representatives of these compounds are e.g. N-dodecylammoniumsulphate, N-hexadecyl ammoniumbenzenesulphonate, N-(10-phenyl-decyl)-ammonium sulphate etc. Further examples of suitable cationic emulsifiers are listed e.g. in Journal of the American Oil Chemical Society 43, (1966), pages 681–682. The known reaction products of ethylene oxide with long-chain fatty alcohols or phenols may be used as nonionic emulsifiers and the reaction products of more than 10 mols of ethylene oxide with 1 mol of a fatty alcohol or phenol are particularly suitable. A total quantity of up to about 20 percent by weight of the emulsifiers based on the total monomer component may be used but preferably from about 2 percent to about 10 percent by weight is employed. However, the emulsion polymerization reaction may be carried out in the absence of emulsifiers, if desired.

The cationic polyurethanes and the monomers to be polymerized may be present at any ratio in the reaction mixture; however, from about 5 percent to about 95 percent by weight of dry cationic polyurethane to about 95 percent to about 5 percent by weight of the monomer is preferred. Most preferred are mixtures of 20 – 80 percent by weight of polyurethane and 80 – 20 percent by weight of olefinic monomer. The polyurethanes are used in the form of their aqueous dispersions and usually have a solids content of from about 5 percent to about 60 percent by weight, preferably from about 8 to about 35 percent by weight. It is especially preferred to use at least 20 percent by weight of a cationic polyurethane and up to 80 percent by weight of a olefinically unsaturated monomers.

The process of the invention is carried out under radical emulsion polymerization conditions. This means 1. the polymerization is carried out in an aqueous phase;
2. the polymerization is carried out in the presence of emulsifying agents for the starting as well as for the end-products which emulsifying agent in the case of the present invention consists either solely of the cationic polyurethane salt or of a combination of the cationic polyurethane salt with an other emulsifying agent;

this means 3. the polymerization is carried out in the presence of radical initiating catalysts at a temperature such to activate these catalysts.

In many instances, the polymers initially used and the polymers grafted thereto undergo chemical reaction in which the degree of grafting is governed by the type of monomers used, the catalysts employed and the polymerization conditions utilized.

In polyurethane dispersions prepared without emulsifiers and without any grafted vinyl components, salt groups take over the function of the emulsifier. These dispersions are distinguished by many interesting service properties including the fact that they can be processed into films of out-standing mechanical strength. Unfortunately, a serious disadvantage of these dispersions is the fact that the salt groups incorporated therein render the polyurethane hydrophilic to a limited extent so that the films prepared therefrom swell in water or even are degraded by hydrolysis By contrast, the films obtained from the vinyl polymer-polyurethane dispersions of this invention have a markedly reduced tendency to swell in water, especially if they are prepared without using an additional emulsifier.

The polyurethane dispersions of this invention may be used as coating compositions, the ultimate hardness and flexibility of which can be adjusted as required by a judicious selection of the starting components. In the area of coatings, adhesives, binders, e.g. for non-woven fabrics, glass fibers and the like the products of the invention are particularly useful, because of their excellent adhesive properties which is probably due to the cationic character of the products and more specifically to the combination of polar cationic salt-groups and urethane or urea groups which are capable of forming hydrogen bonds on the one hand and hydrophobic grouping of the vinyl type as well as the polyester or polyether type on the other hand. Adhesive properties are especially good on substrates having an electronegative charge such as textiles, paper, heather and glass.

The invention is further illustrated but is not intended to be limited by the following examples in which all parts and percentages are by weight unless otherwise specified.

The following polyurethane dispersions, for example, may be used in the process of this invention.

POLYURETHANE DISPERSION I

About 260 parts of a polythioether having an OH number of 71.5 and prepared from about 70 parts of thiodiglycol and about 30 parts of 1,6-hexane diol are stirred for about 50 minutes at about 80°C. with about 530 parts of tolylene diisocyanate (isomer mixture 65:35). In the meantime, about 8 parts of trimethylol propane are introduced followed, after cooling to about 45°C., by the successive addition of about 350 ml of acetone, about 155 parts of diethylene glycol, about 68 parts of hexane-1,6-diol and about 78 parts of N-methyl diethanolamine in about 512 ml of acetone. The mixture is stirred for about one hour at about 50°C., followed by the addition of about 9.5 ml of dimethyl sulphate, about 5.4 parts of 1,3-dimethyl-4,6-bis-chloromethyl benzene and about 563 ml of acetone, after which the mixture is stirred for another 2 hours at about 50°C. About 8 ml of about an 85 percent aqueous phosphoric acid solution in about 60 ml of water are then added followed by the addition at 70°C. of about 1,160 ml of water. The acetone is then distilled off in a water jet vacuum.

About 2,350 parts of about a 48 percent latex are obtained which, after standing for 10 days at room temperature, is no longer soluble in tetrahydrofuran but can only be mixed with it accompanied by hazing.

POLYURETHANE DISPERSION II

About 2,600 parts of a polyether (OH number 78) obtained from about 70 parts of thiodiglycol and about 30 parts of 1,6-hexane diol are stirred for about 50 minutes at about 80°C. with about 25,300 parts of tolylene diisocyanate (isomer mixture 65:35). Thereafter, the successive addition of about 1,040 parts of diethylene glycol over a period of about 13 minutes, about 1,400 parts of 1,4-butane diol over a period of about 30 minutes and a solution of about 780 parts of N-methyl diethanolamine in about 5.1 liters of acetone is carried out while cooling so that a temperature of from about 50° to about 60°C. is maintained. A solution of about 126 parts of dimethyl sulphate and about 54 parts of 1,3-dimethyl-4,6-bis-chloromethyl benzene in about 280 ml of acetone is then added. After about 6.3 liters of acetone are added, stirring is continued at about 50°C. until a viscosity of from about 200 to about 500 poises has been obtained. The solution is then very thick and hazy and cannot be further diluted with acetone. About 135 parts of about an 85 percent phosphoric acid solution, about 110 parts of triethyl phosphate in about 640 ml of water, and about 11.6 liters of water are then successively stirred in. The acetone is then distilled off in a water jet vacuum.

About 22 liters of about a 50 percent polyurethane latex which is thinly liquid are obtained which, after storage for several days, is no longer soluble in tetrahydrofuran but can only be mixed with it accompanied by hazing.

POLYURETHANE DISPERSION III

About 25,000 parts of a polyester (OH number 64) obtained from adipic acid, phthalic acid and ethylene glycol (molar ratio 1:1:1.2) and about 6,480 parts of tolylene diisocyanate (isomer mixture 65:35) are stirred for about 2 hours at about 70°C. About 10.4 liters of dimethyl formamide are added to the prepolymer thus formed, followed by the introduction of about 2,600 parts of N-methyl diethanolamine and another 5.2 liters of dimethyl formamide while cooling. About 105 parts of dibutylamine in about 260 ml of dimethyl formamide are then added. A solution of about 780 parts of 1,3-dimethyl-4,6-bis-chloromethyl benzene is then added at about 50°C., followed about 10 minutes later by the introduction of a solution of about 765 parts of about an 85 percent phosphoric acid solution in about 3.1 liters of water. The product is then diluted with about 237.8 liters of water at about 50°C. and about 30 liters of dimethyl formamide.

About a 29 percent dimethyl formamide-water-polyurethane dispersion is obtained which remains hazy when diluted with tetrahydrofuran, thus indicating that it consists of gel-like latex particles.

EXAMPLE 1

About 20 parts of a mixture of about 60 parts of butyl acrylate, about 40 parts of acrylonitrile, about 0.5 part of cumene hydroperoxide, and about 10 parts of a solution of about 0.1 part of sodium formaldehyde sulphoxylate in about 50 parts of water are added to batches of about 450 parts of each of Polyurethane Dispersions I, II and III while stirring in a nitrogen atmosphere at about 50°C., and diluted with water to a solids content of about 8 per cent. The rest of the monomer mixture consisting of 80 parts of the above mixture of 60 parts of butylacrylate and 40 parts of acrylonitrile and the sulphoxylate solution are then successively added dropwise to the reaction mixture uniformly over a period of about 2 hours and the complete mixture is stirred for about 5 hours at about 50°C. Polymer dispersions which yield coherent tear-resistant films when dried on glass plates and which have a solids content of from about 22 percent to about 23 percent are thus obtained.

EXAMPLE 2

Films are prepared from Polyurethane Dispersion III as well as Polyurethane Dispersion III modified with a copolymer of butyl acrylate and acrylonitrile as described in Example 1 by drying these dispersions on glass plates in air at room temperature, and storing the air-dried films in water for about 16 hours at room temperature. While the film obtained from pure Polyurethane Dispersion III increases in weight by about 80 percent of its original weight, the water absorption of the modified polyurethane film is only about 30 percent.

EXAMPLE 3

About 139 parts of about a 29 per cent Polyurethane Dispersion III are diluted with about 161 parts of water and a mixture of about 60 parts of styrene, about 0.4 part of cumene hydroperoxide and a solution of about 0.1 part of sodium formaldehyde sulphoxylate in about 40 parts of water are successively added dropwise to the resulting mixture while stirring in a nitrogen atmosphere over a period of about 2 hours at about 50°C., followed by stirring for about 1 hour.

A stable polymer dispersion having a solids content of about 25 percent is thus obtained. A hard polymer film is produced when the polymer dispersion is dried on a glass plate.

EXAMPLE 4

Stable 25 percent copolyurethane dispersions are prepared as described in Example 3 from monomer mixtures of (1) about 45 parts of butyl acrylate and about 15 parts of vinyl acetate and (2) about 45 parts of butyl acrylate and about 15 parts of vinylidene chloride. These dispersions yield soft, elastic films when dried on glass plates.

EXAMPLE 5

About 3,000 cc. of polyurethane III, about 3,000 cc. of desalted water and about 300 parts of vinyl chloride are stirred and emulsified at about 5°C. in a polymerization vessel. Equal quantities of:

1. a mixture of about 200 cc. of water and about 5 parts of 30 per cent $H_2O_2$ and
2. a solution of about 10 parts of sodium formaldehyde sulphoxylate in about 100 cc. of water are then separately introduced over a period of about 30 minutes into the stirred emulsion. The reaction mixture is kept at about 5°C. during polymerization which is terminated after about 5 hours. The emulsion reaction product is freed from excess monomer in a gas separator and adjusted in vacuo to a solids content of about 25 percent. The resulting concentrated emulsion is stable and yields elastic films when dried on glass plates. A polymer sample contains about 2 percent of Cl after precipitation with a mixture of methanol, ammonia and water (90:2:8).

EXAMPLE 6

The procedure described in Example 4 is carried out except that a mixture of about 100 cc. of water and about 10 parts of tert-butyl hydroperoxide is used instead of the $H_2O_2$-water mixture. A stable emulsion is again obtained; however, a precipitated polymer sample has a chlorine content of 6.9 percent.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the production of stable aqueous polymer dispersions which comprises polymerizing 5 to 95 percent by weight based on the total amount of non-aqueous matter of olefinically unsaturated monomers under free radical emulsion polymerization conditions in the presence of 95 to 5 percent by weight based on the total amount of non-aqueous matter of a cationic polyurethane prepared by reacting an organic polyisocyanate with an organic compound having at least two hydrogen atoms reactive with NCO groups and from about 0.5 to about 10 percent by weight of all of the reactants of the polyurethane reaction mixture of a cross-linking agent, which cationic polyurethane contains from about 0.05 to about 5 percent by weight of ammonium- or sulphonium groups, is gel-like in character, insoluble in tetrahydrofuran and present in the form of a stable aqueous dispersion.

2. The process of claim 1 wherein the radical emulsion polymerization is carried out in the presence of an inorganic peroxide, an organic peroxide, an alkyl hydroperoxide, a dialkyl peroxide, a peroxy ester or mixtures thereof as catalysts.

3. The process of claim 2 wherein the catalysts are present in quantities of from 0.01 to about 5 percent by weight based on the total weight of the vinyl monomer.

4. The process of claim 1 wherein the radical emulsion polymerization is carried out at a temperature of from about 0° to about 150°C.

5. The process of claim 1 wherein the reaction mixture contains an emulsifier.

6. The process of claim 1 wherein the polyurethane is present in the form of an aqueous dispersion having a solids content of from about 5 to about 60 percent by weight.

7. The process of claim 1 wherein the cationic polyurethane cross-linking agent is a trifunctional polyol or a polyisocyanate.

8. The stable aqueous polymer dispersion prepared by the process of claim 1.

* * * * *